United States Patent
Hajdukiewicz et al.

(10) Patent No.: US 7,086,170 B2
(45) Date of Patent: Aug. 8, 2006

(54) ANALOGUE PROBE

(75) Inventors: Peter Hajdukiewicz, Gloucestershire (GB); Geoffrey McFarland, Gloucestershire (GB)

(73) Assignee: Renishaw PLC, Gloucestershire (GB)

( * ) Notice: Subject to any disclaimer, the term of this patent is extended or adjusted under 35 U.S.C. 154(b) by 77 days.

(21) Appl. No.: 10/501,901

(22) PCT Filed: Jan. 27, 2003

(86) PCT No.: PCT/GB03/00335

§ 371 (c)(1),
(2), (4) Date: Jul. 20, 2004

(87) PCT Pub. No.: WO03/062738

PCT Pub. Date: Jul. 31, 2003

(65) Prior Publication Data

US 2005/0126027 A1    Jun. 16, 2005

(30) Foreign Application Priority Data

Jan. 26, 2002    (GB) ................................. 0201845.5

(51) Int. Cl.
*G01B 5/207*    (2006.01)
(52) U.S. Cl. ........................................... 33/558
(58) Field of Classification Search ................ 33/503, 33/504, 556, 558, 559, 561, 572
See application file for complete search history.

(56) References Cited

U.S. PATENT DOCUMENTS

| | | | |
|---|---|---|---|
| 3,869,799 A | | 3/1975 | Neuer et al. |
| 4,158,919 A | | 6/1979 | McMurtry |
| 4,288,925 A | * | 9/1981 | McMurtry ................ 33/561 |
| 4,553,332 A | * | 11/1985 | Golinelli et al. ............ 33/561 |
| 4,611,403 A | * | 9/1986 | Morita et al. ............... 33/558 |
| 4,701,704 A | * | 10/1987 | Fukuyoshi et al. .......... 33/558 |
| 4,702,013 A | | 10/1987 | McMurtry |
| 4,813,151 A | * | 3/1989 | Hajdukiewicz et al. ...... 33/561 |
| 4,916,339 A | | 4/1990 | Lloyd |
| 5,040,308 A | * | 8/1991 | Meyer ....................... 33/556 |
| 5,048,194 A | | 9/1991 | McMurtry |

(Continued)

FOREIGN PATENT DOCUMENTS

EP    0 568 120 B1    9/1996

(Continued)

OTHER PUBLICATIONS

Disclosed Anonymously, "Research Disclosure", The International Journal For Companies Seeking an Alternative or Supplement to Obtaining Patents, May 1992, One page.

*Primary Examiner*—G. Bradley Bennett
(74) *Attorney, Agent, or Firm*—Oliff & Berridge, PLC (57) ABSTRACT

A probe 8 comprises a housing 10 and a member 20 movable with respect to the housing onto which a stylus 12 may be mounted such that movement of the stylus results in movement of the member and a primary transducer 50, 52 for measuring movement of the member relative to the housing. The member may be located in a precisely defined rest position 22, 24 with respect to the housing, putting the probe in a mechanical datum position. For a combined transducer probe, this enables the primary transducer 52, 54 to be locked while enabling use of a secondary transducer 70. The primary transducer outputs can be datumed while in this mechanical datum position. Drive 40, 50, 60 or bias 26 means in one axis secure the member in its rest position in all axes.

15 Claims, 9 Drawing Sheets

U.S. PATENT DOCUMENTS

| | | | |
|---|---|---|---|
| 5,208,993 A * | 5/1993 | Harding | 3/559 |
| 5,209,131 A | 5/1993 | Baxter | |
| 5,212,873 A * | 5/1993 | McMurtry | 33/559 |
| 5,327,657 A * | 7/1994 | Hajdukiewicz et al. | 33/503 |
| 5,390,423 A | 2/1995 | Butter et al. | |
| 5,394,618 A * | 3/1995 | Morz | 33/559 |
| 5,806,201 A * | 9/1998 | Feichtinger | 33/561 |
| 6,430,833 B1 | 8/2002 | Butter et al. | |
| 6,643,944 B1 * | 11/2003 | Yoda et al. | 33/558 |
| 2004/0128848 A1 * | 7/2004 | Szenger et al. | 33/561 |

FOREIGN PATENT DOCUMENTS

| | | |
|---|---|---|
| EP | 1 262 733 A2 | 12/2002 |
| GB | 1 551 218 | 8/1979 |
| WO | WO 00/60310 | 10/2000 |

* cited by examiner

ANALOGUE PROBE

The present invention relates to an analogue probe with a stylus for contacting a workpiece.

Analogue probes are well-known and an example of a probe is described in our UK Patent No. 1,551,218. This patent describes a probe suspension mechanism which comprises three orthogonally arranged pairs of parallel springs connected in series between a fixed point on the probe housing and a movable member to which the workpiece-contacting stylus is connected. An analogue probe may be mounted on a coordinate positioning machine, for example a coordinate measuring machine, a machine tool or manually positionable measuring arm.

During a measuring operation on a workpiece using such a probe, a machine on which the probe is mounted is driven towards a workpiece to bring the stylus into contact with the workpiece. When the tip of the stylus contacts the workpiece the stylus will be deflected as the machine continues to move and measuring transducers within the probe generate outputs representing deflections of the probe stylus along three orthogonal axes. The outputs representing stylus deflection are combined with the machine outputs representing the position of the probe to give a true indication of the stylus tip position and therefore information about the surface of the workpiece. The term "analogue probe" refers to the fact that the outputs represent stylus deflection; in practice the outputs may be in digital form rather than analogue form.

Ideally it would be arranged that the axes of the probe are aligned with the coordinate axes of the machine when the probe is mounted on the machine so that the measuring deflections of the probe stylus will take place along the axes of the machine. However, such alignment is not always possible to achieve.

In addition there may be misalignment between the probe axes such that they are not orthogonal. Furthermore, the scaling factors of the true probe axes will in general deviate from their nominal values.

Therefore it is usual to calibrate the probe and machine system to determine the effects of any such misalignment and scaling error and thereafter to correct any measurements made on the workpiece for these effects.

To calibrate the probe it is desirable for the probe to have a datum position. This is a reference position in the travel of the stylus to which all the probe outputs refer.

U.S. Pat. No. 3,869,799 describes an analogue probe provided with a fixed mechanical geometrical zero point. Motors within the probe are used to secure the probe in each of the X, Y and Z directions at the fixed mechanical geometrical zero point. Each axis of the probe is thus secured independently by its own motor and detent system.

The probe also has an electrical zero point which coincides with the mechanical geometrical zero point. Thus when the probe is driven to its mechanical geometrical zero point, the electrical output from the transducers reads zero.

The use of motors to drive the probe into its mechanical geometrical zero point has the disadvantage that the size, weight, cost and control complexity of the probe are all increased.

A first aspect of the present invention provides a dual transducer probe for use in measuring apparatus comprising:
  a housing;
  a member movable with respect to the housing onto which
    a stylus may be mounted such that movement of the
    stylus results in movement of the member;
  a first transducer for measuring movement of the member
    relative to the housing;
  a second transducer which measures a property of the
    probe or the relationship between the probe and a
    surface adjacent the probe;
  wherein the member may be located in a defined rest
    position with respect to the housing;
  and wherein when the member is located in this defined
    rest position, the first transducer is locked but the
    second transducer is not locked.

The property of the probe or the relationship between the probe and a surface adjacent the probe measured by the second transducer could be, for example, deflection of the stylus of the probe or the distance between the probe and an adjacent surface. The term deflection includes both displacement and bending of the stylus of the probe.

The member and the housing or a body connected to the housing may each be provided with complementary location elements whereby the member or body may be biased or driven to a position where the member is held in a defined rest position with respect to the housing, said defined rest position being defined by the location elements.

Preferably the member or the body may be biased or driven along a single axis to a position where the member is held in a defined rest position in at least two axes. When the member is located in its defined rest position, its movement may be constrained in three dimensions. The defined rest position may be a kinematically defined rest position.

The second transducer may produce a touch trigger signal. Alternatively the second transducer may measure a range of movement of the member relative to the housing. The second transducer may be a non-contact transducer.

A second aspect of the present invention provides an analogue probe for use in measuring apparatus comprising:
  a housing;
  a member movable with respect to the housing onto which
    a stylus may be mounted such that movement of the
    stylus results in movement of the member;
  wherein the member and the housing or a body connected
    to the housing are each provided with complementary
    location elements;
  whereby one of the member and the body may be biased
    or driven along one axis to a position where the
    member is held in a defined rest position with respect
    to the housing about at least two axes, said defined rest
    position being defined by the location elements.

The precisely defined rest position acts as a datum position for calibration of the probe and is a home/reference position to which all the probe outputs refer.

Preferably biasing means or driving means is used to bias or drive the member or the body to a position where the member is held in the defined rest position, and whereby during movement of the member or the body, the biasing or driving means allows movement of the member relative to the housing in a direction perpendicular to said axis.

In one embodiment, biasing means are provided to bias the member into the defined rest position and wherein the member is biased into the defined rest position when there is no stylus mounted on the member. When a stylus is mounted on the member, the weight of the stylus pulls the member away from the defined rest position.

In another embodiment driving means are provided to drive the member or body to a position where the member is held in the defined rest position.

The probe may be provided with a first transducer which measures the movement of the member relative to the housing and a second transducer which measures a property of the probe or the relationship between the probe and a surface adjacent the probe, whereby when the member is in the defined rest position the first transducer is locked and the second transducer is not locked.

A third aspect of the present invention provides a method of datuming an analogue probe for use in measuring apparatus, the analogue probe comprising a housing, a member movable with respect to the housing onto which a stylus may be mounted such that movement of the stylus results in movement of the member, a transducer for measuring the position of the member relative to the housing, wherein the member and the housing or a body connected to the housing are each provided with complementary location elements, comprising the steps of:

biasing or driving one of the member and the body to a position where the member is held in a defined rest position with respect to the housing;

outputting the transducer readings to a digitising circuit and setting a digital counter of the digitising circuit to zero.

The datum value for the probe may be set by simple electronic control.

Preferred embodiments of the invention will now be described by way of example with reference to the accompanying drawings wherein.

Figure 1:
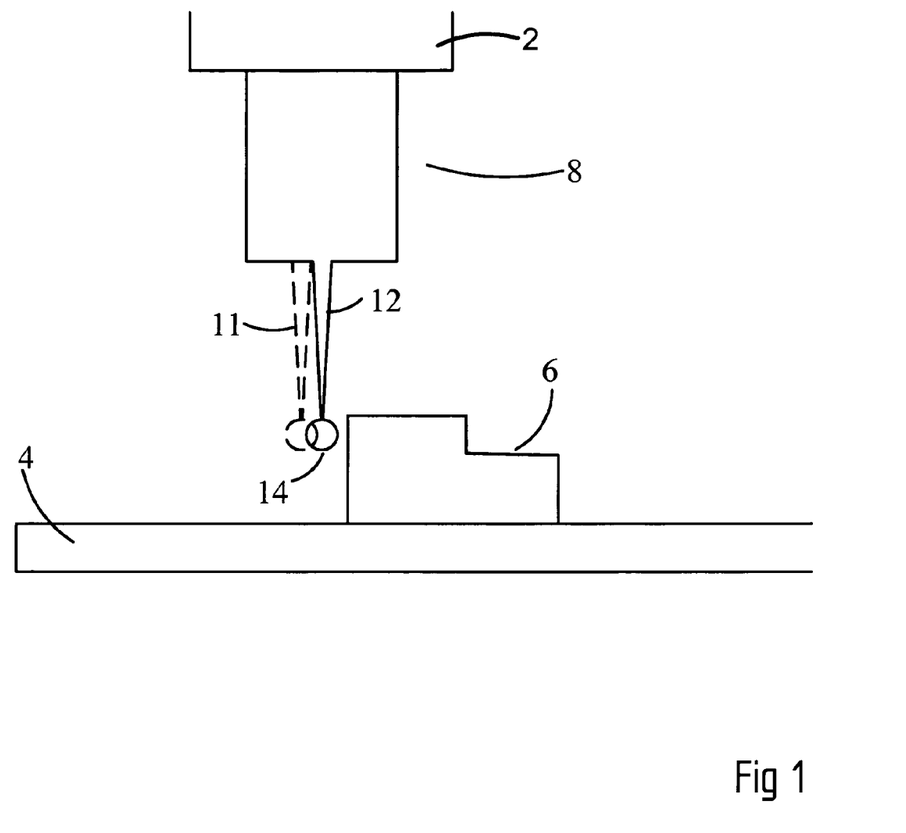
FIG. 1 shows an analogue probe with its stylus in contact with a workpiece.

FIG. 1 shows an analogue probe 8 mounted on the quill 2 of a coordinate measuring machine (not shown). A workpiece 6 to be measured is placed on the table or bed 4 of the coordinate measuring machine. The analogue probe 8 has a stylus 12 with a workpiece-contacting tip 14. The probe 8 is moved until the workpiece-contacting tip 14 of the stylus 12 comes into contact with the workpiece 6. The stylus is thus displaced (relative to the housing of the probe) to a position 11 shown by the dashed lines and the displacement of the stylus is measured by transducers inside the analogue probe. The outputs of these transducers are combined with the output of the coordinate measuring machine representing the position of the probe 8 to indicate the position of the workpiece-contacting tip 14 and thus the workpiece 6.

Figure 2:
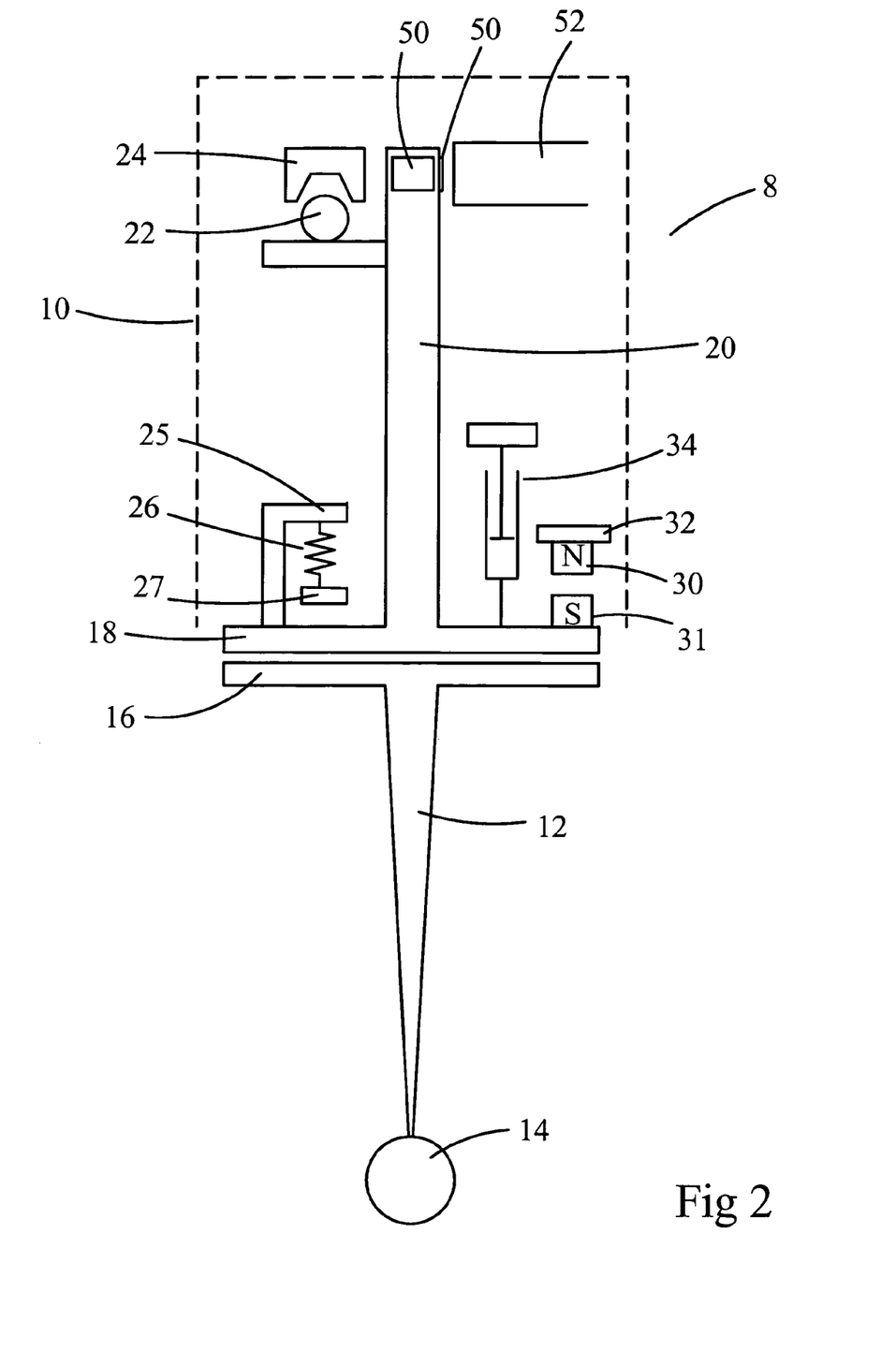
FIG. 2 shows a simplified internal view of the probe with biasing means.

FIG. 2 shows a simplified view of an analogue probe 8 of the invention which comprises a probe housing 10 and stylus 12. The stylus has a workpiece-contacting ball 14 at one end for touching the workpiece and the stylus is movable with respect to the probe housing 10. The stylus 12 is demountable from the rest of the probe and may be removed and exchanged with other styli, for example it may be exchanged with styli of different lengths. The stylus is provided with a flange 16 which is connectable to a stylus mounting plate 18 of the probe. The stylus flange 16 and stylus mounting plate 18 may be held together magnetically and may be provided with kinetic elements to define the position of the stylus with respect to the stylus mounting plate 18 and ensure repeatability of location of the stylus.

The stylus mounting plate is attached to a central rod 20 inside the probe housing. The stylus 12 and rod 20 are rigidly connected so that the stylus 12 and rod 20 move together.

The probe may be of the type disclosed in UK Patent No. 1,551,218 in which three pairs of parallel springs restrict rotational movement of the rod 20 and stylus 12 and thus only allow translational movement.

Alternatively the probe could be of another type, for example a probe which allows translational movement about a pivot, as described in U.S. Pat. No. 6,430,833.

Transducers are provided in the probe to measure the movement of the rod 20 with respect to the housing 10. For example, the rod 20 may be provided with optical scales 50 with corresponding optical readheads 52 provided within the probe housing to measure displacement of the rod 10 and stylus 12 with respect to the housing 10. This is described further in European Patent No. 0568120. Other transducers may be used, for example LVDT absolute transducers.

A locating element comprising a ball 22 is provided on the rod 20 and a corresponding locating element comprising a recess 24 is located at a fixed position within the probe housing 10. The recess may, for example, be tri-hedral, conical or a cluster of 3 balls. The rod 20 may be pushed upwards so that the ball 22 engages with the recess 24. When the ball 22 and recess 24 are in engagement the position of the rod 20 is thus defined. The ball and recess define the position of the rod 20 in three linear degrees of freedom. In the type of analogue probe in which the rod 20 is constrained from angular motion no further restraint is necessary. However a probe in which angular movement of the rod is not constrained requires further connecting pairs of elements, for example three pairs of elements will provide the support which constrains all degrees of freedom. The rod is thus constrained kinematically.

The present embodiment discloses ball and recess locating elements, however other locating means may be used. In this embodiment the ball and recess may be on either the rod 20 or the fixed surface.

Figure 3:
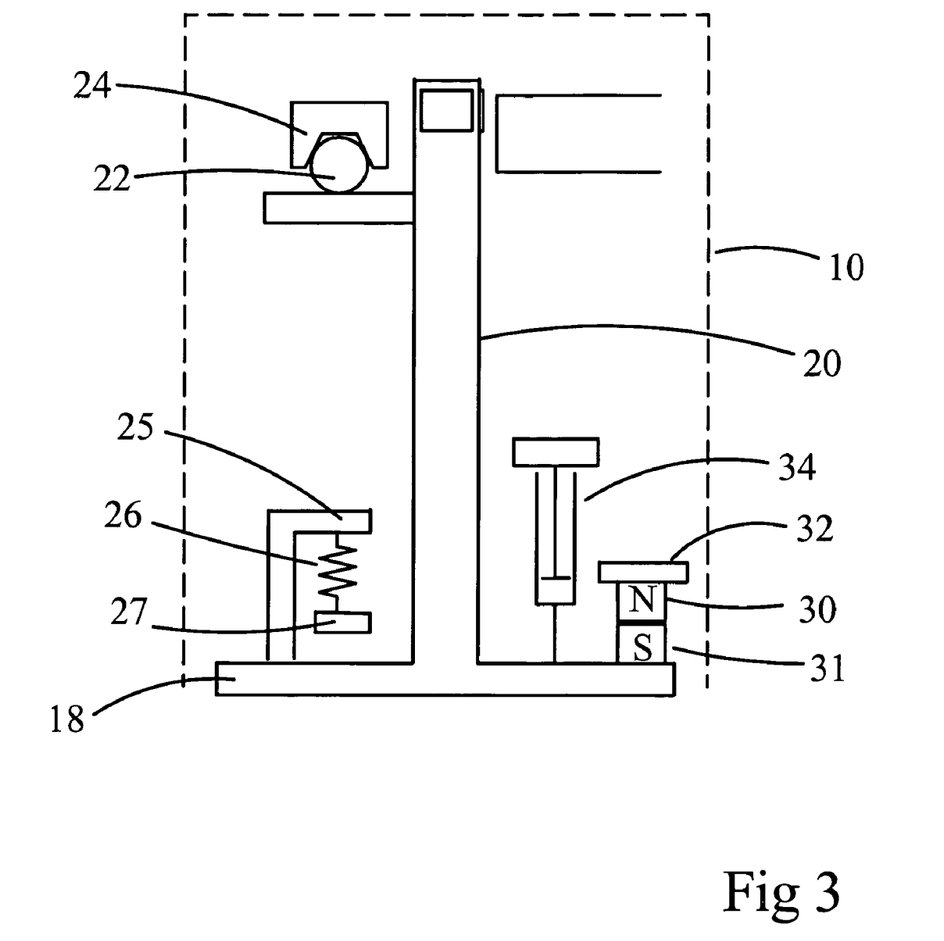
FIG. 3 shows the probe shown in FIG. 2 with the stylus removed.

As shown in FIG. 2 if the stylus 12 is connected to the rod 20, the weight of the stylus 12 pulls the rod 20 away from the reference position. However, as shown in FIG. 3, if the stylus is removed from the probe the rod 20 is biased into the reference position.

A spring 26 is provided to bias the rod 20 into the reference position. FIGS. 2 and 3 show a compression spring 26 with one end of the spring connected to a surface 25 which is connected to the stylus mounting plate 18 and the other end to a surface 27 within the probe. Alternatively the spring may comprise a tension spring which may, for example, be connected between the stylus mounting plate 18 and a fixed surface within the probe. If a stylus 12 is attached to the rod 20, the weight of the stylus will counterbalance the spring 26 and the rod 20 will therefore not be pulled into the reference position. In the event of the stylus 12 being removed from the probe the rod 20 will be pulled into the reference position by the spring 26.

Magnets 30,31 are provided which attract the rod 20 into the reference position once it is almost in position (and the magnets are close together). The magnets also hold the rod 20 in this reference position. FIGS. 2 and 3 show magnets 30,31 located on the stylus mounting plate 18 and on a surface 32 within the probe housing. The magnets may have alternative locations, for example adjacent the locating elements.

A damper 34 is provided to ensure that the movement of the rod 20 to its reference position is smooth and uncontrolled shocks to the probe are eliminated.

The probe has the advantage that it returns to its reference position whenever the stylus is removed with no manual intervention required. As the probe is biased into this reference position no control lines are required (i.e. as would be required if the process was motorised), thus the probe controller is only required to read output from the probe.

When the probe is mounted on a coordinate measuring machine and calibrated the probe is automatically in its datum position. This datum position acts as a reference point to which the probe outputs refer. This is advantageous if the transducers are non absolute measuring devices.

The outputs from the transducers are input into a digitising circuit. When the probe is in its datum position, counters in the digitising circuit are set to zero thereby setting an electrical reference point at the mechanical datum point.

A disadvantage of this embodiment is that if the stylus module is replaced with a lighter one (having a shorter stylus for example), the stylus module may not be heavy enough to pull the probe out of its datum position. This problem is overcome in the following alternative embodiments of the invention, in which means are provided to drive the probe into the datum position. All of the following methods of driving the probe into the datum position allow some movement in the X and Y directions so that as the probe is moved upwards in the Z direction, the play in X an Y allows it to adjust itself into the datum position.

Figure 4:
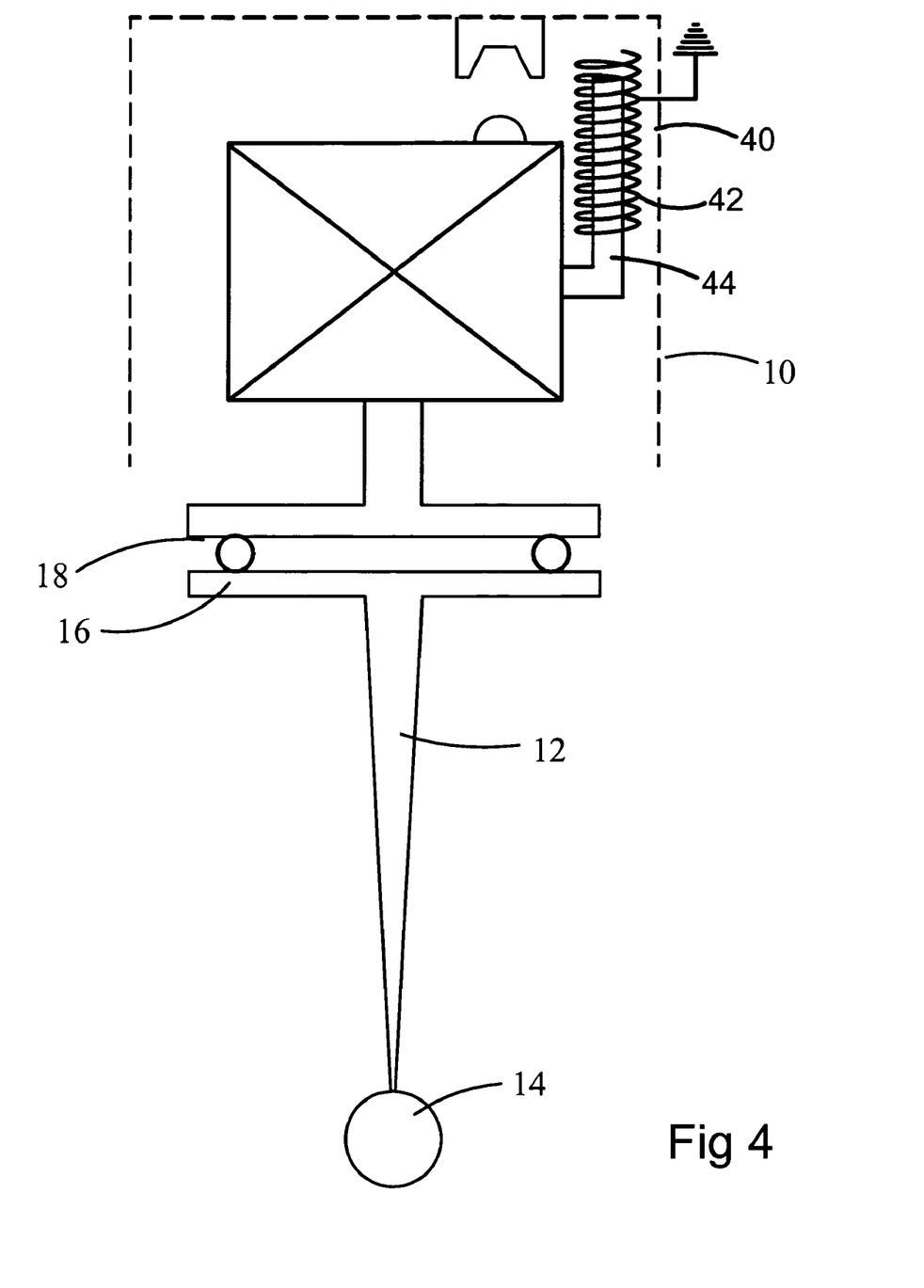
FIG. 4 shows a simplified internal view of the probe with solenoid driving means.

FIG. 4 illustrates a probe in which a solenoid 40 is provided to drive the probe into the datum position. The solenoid comprises a coil 42 mounted in a fixed position relative to the housing 10 with a central rod 44 which is connected directly or indirectly to the stylus mounting plate 18. When an electrical current is passed through the coil 42, the rod 44 will be pulled upwards, until the probe reaches the datum position. The clearance in the solenoid is enough to allow movement in the X and Y directions of the rod 44.

Figure 5:
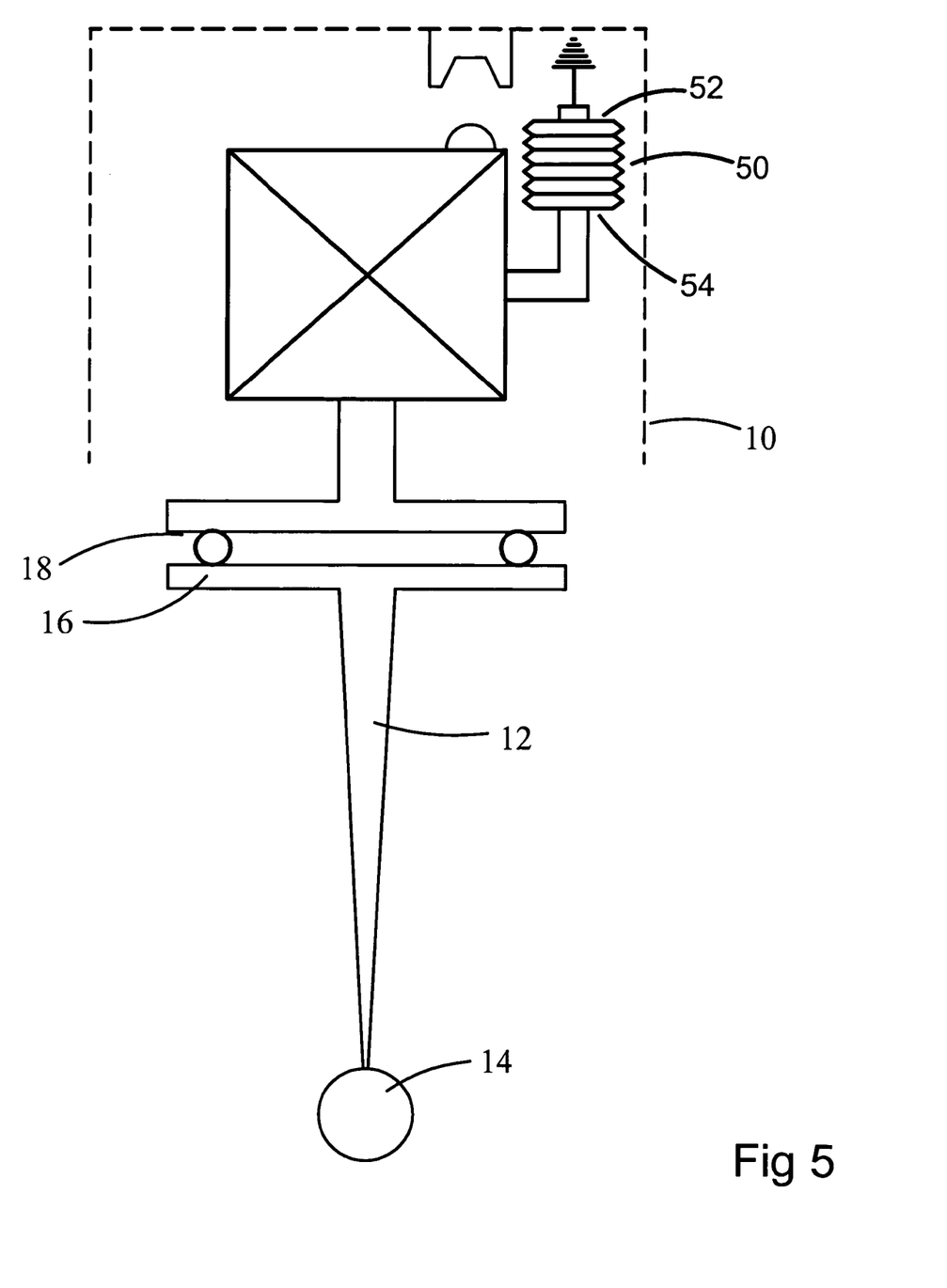
FIG. 5 shows a simplified internal view of the probe with a bellow driving means.

FIG. 5 illustrates a bellows arrangement 50 which may be used to drive the probe into the datum position. Bellows 50 are mounted at one end 52 in a fixed position relative to the probe housing 10. The bellows 50 are connected at the other end 54 directly or indirectly to the stylus mounting plate 18. When the bellows 50 are evacuated, the probe will be pulled into the datum position. Alternatively the arrangement may be reversed so that the bellows are pressurised to push the member into the datum position. As in the previous example, the bellows allows some play in the X and Y directions during movement in the Z direction.

Figure 6:
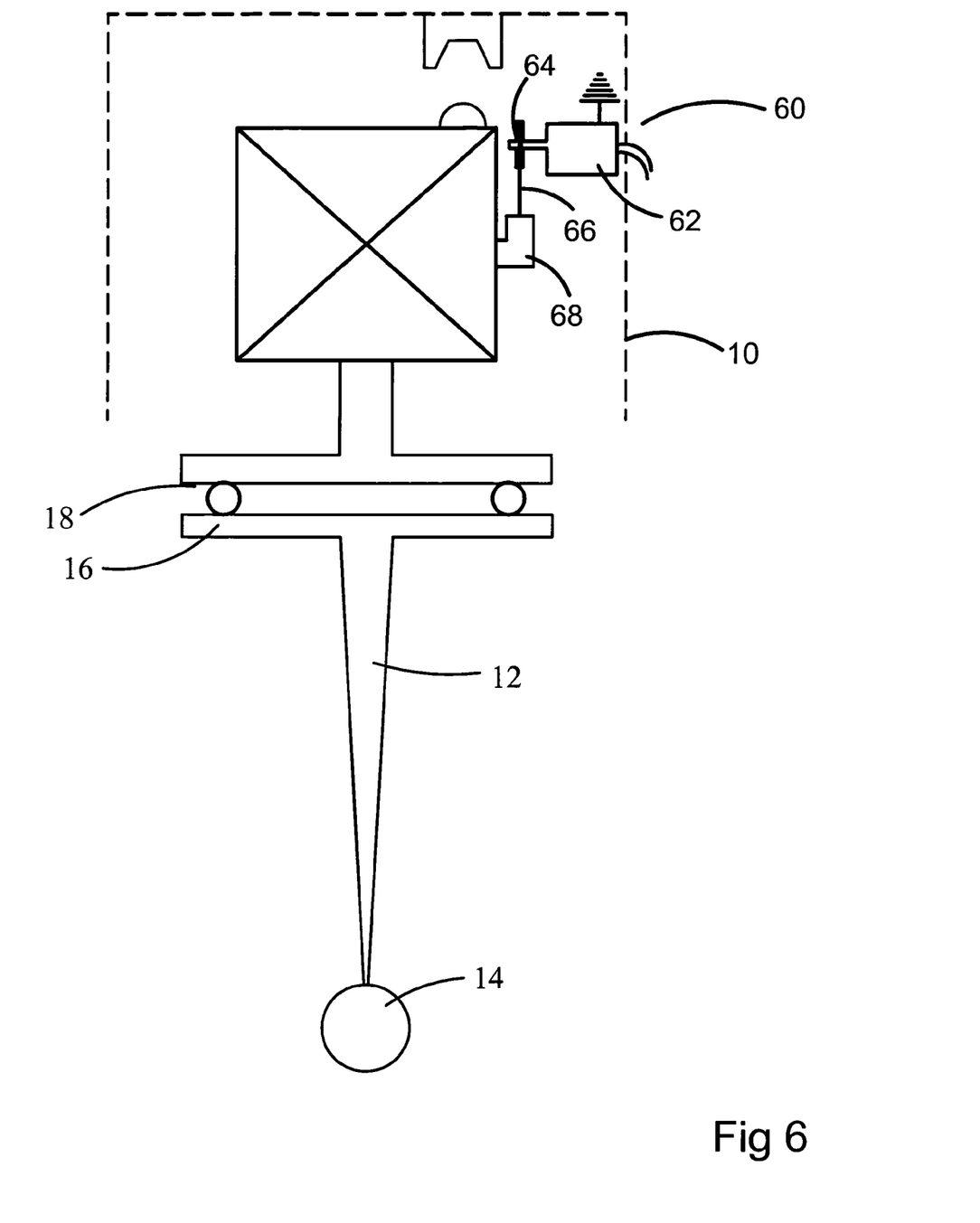
FIG. 6 shows a simplified internal view of the probe with motor driving means.

FIG. 6 illustrates a motor and pulley arrangement 60 in which the probe may be winched into the datum position. The motor 62 is mounted in a fixed relationship to the probe housing. A rotatable pulley 64 of the motor is used to raise or lower a cable 66 which is connected to mount 68 which in turn is connected directly or indirectly to the stylus mounting plate 18. As in the previous examples, this type of arrangement allows some play in the X and Y directions during movement in the Z direction.

Figure 9:
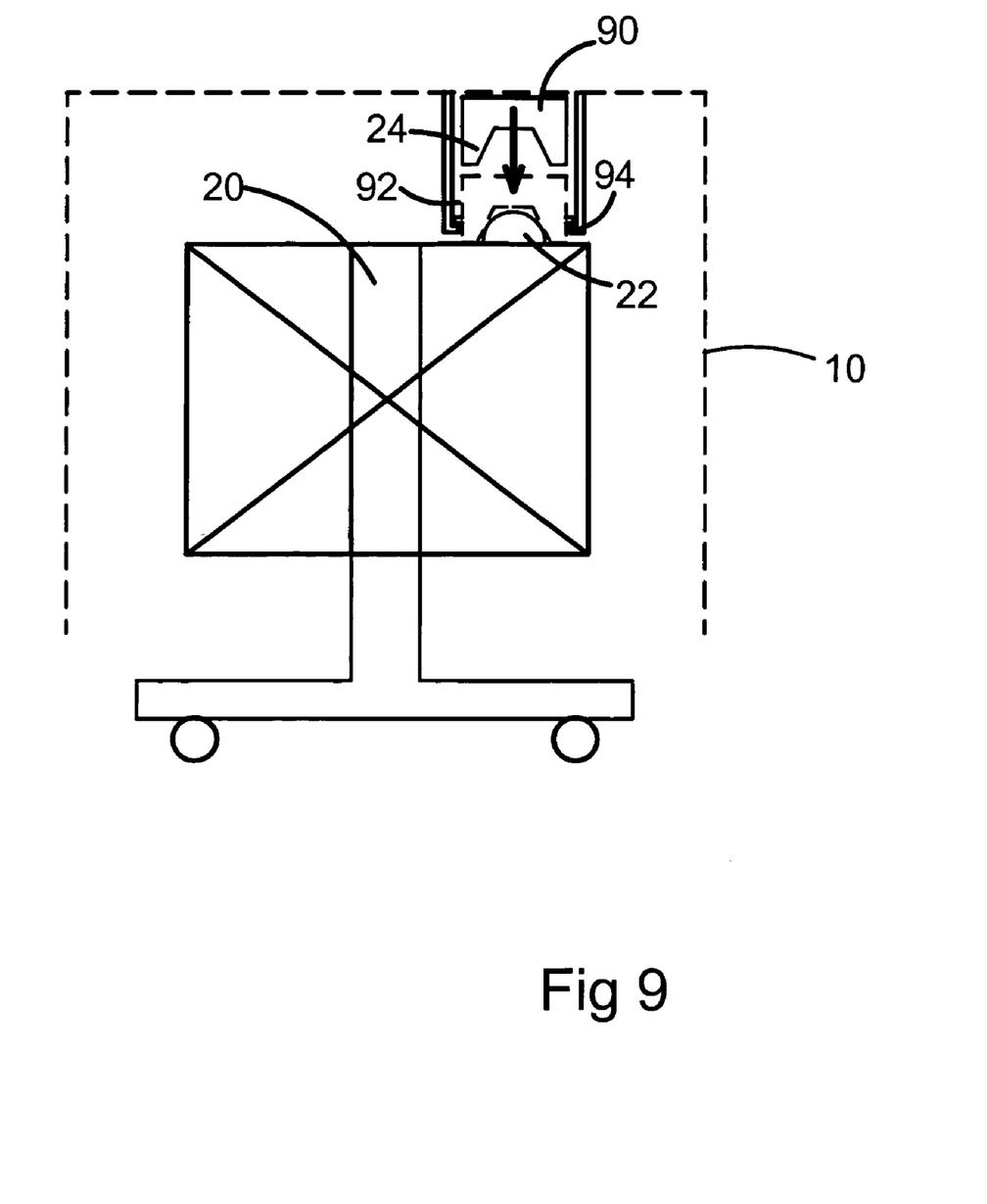
FIG. 9 illustrates a simplified internal view of a variation of the analogue probe shown in FIG. 3.

These embodiments all have the similarity with the first embodiment that they provide a repeatable mechanical datum. As illustrated in FIG. 9, instead of the member being biased or driven upwards into the mechanical datum position, the body 90 in which the locating element 24 is located may be biased or driven towards the member 20 to a predefined position e.g. as defined by stop 94. When the body 90 is in the predefined position, shown by the dashed lines 92, the locating element 24 on the body and the locating element 22 on the member will connect to thereby hold the member in a predefined position.

All of the above examples of biasing or driving the probe into its datum position act by biasing or driving the probe along one axis whilst allowing movement perpendicular to this axis. This enables a single motor or biasing device to be used to put the probe into the datum position which defines its position about all three axes. Otherwise the probe would need to be driven or biased along each axis which would increase the weight, size and complexity of the probe.

In this system described by the above examples, a predefined electrical zero point for the transducer outputs is not required. Once the probe has been biased or driven into its datum position, the outputs from the transducers are set to zero. Therefore, the outputs of the probe transducers are not required to produce the mechanical datum but in fact the mechanical datum is used to produce an electrical datum for the transducers.

Figure 7:
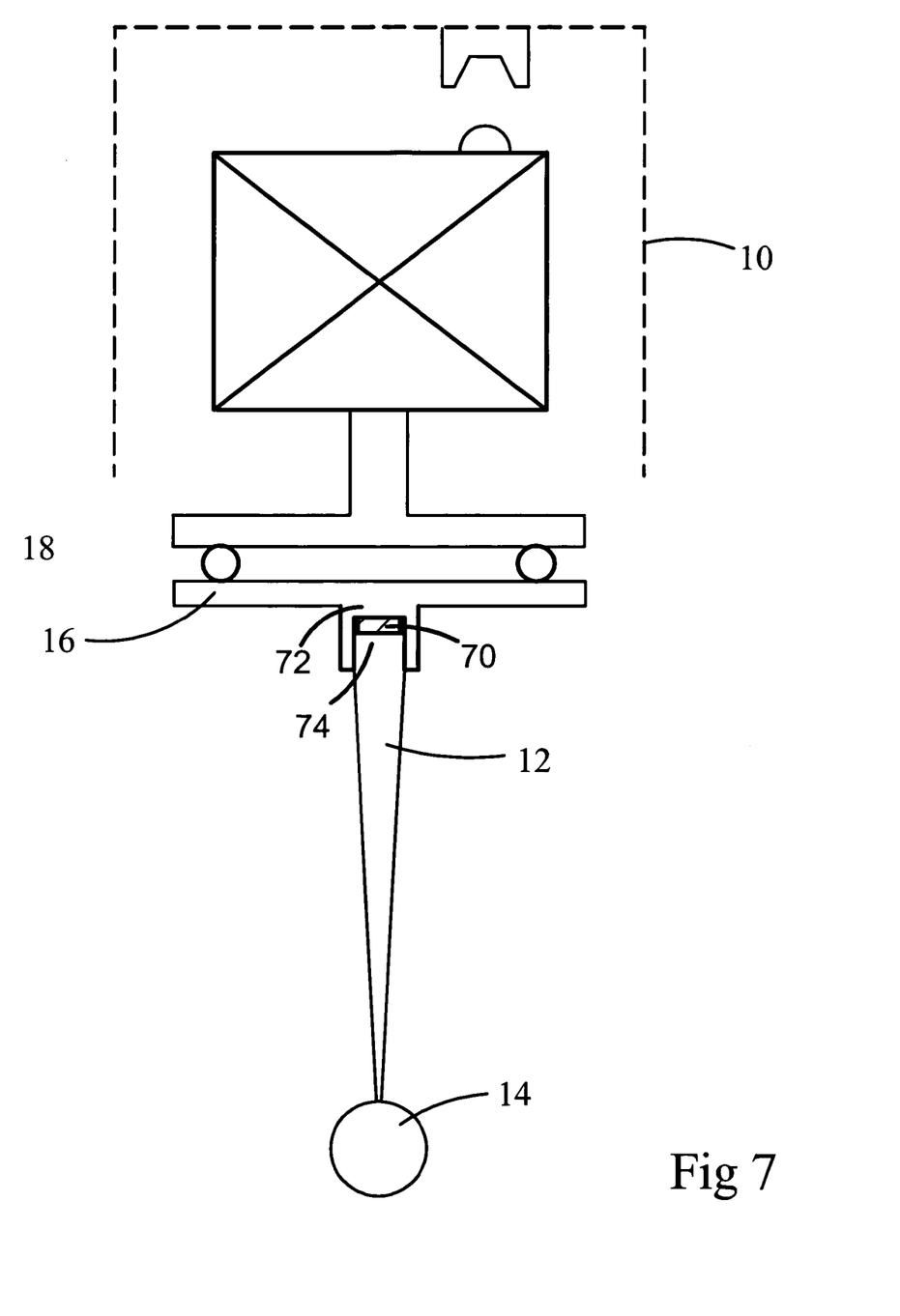
FIG. 7 shows a simplified internal view of a combined analogue and touch trigger probe.

A second use of the invention will now be described. Probes are known which combine analogue scanning probes (as described above) and touch trigger probes and such a probe is disclosed in EP0344289. FIG. 7 illustrates an analogue probe as described in the previous examples which is also capable of taking touch trigger measurements. The internal mechanisms of the analogue probe are well known and will not be further described here.

To provide for a trigger signal upon initial contact of the stylus 12 with a workpiece, a piezoelectric crystal 70 is sandwiched between two portions 72,74 of the stylus 12. Electrical connections (not shown) are made to each side of the piezoelectric crystal 70 and provide an electrical signal from the shock wave generated in the stylus upon impact of the stylus with a workpiece. This signal is processed to provide a trigger signal by a signal conditioning circuit.

Rather than provide the piezoelectric crystal in the location described above, it is possible to substitute an entire trigger probe such as described in our International Patent Application No. WO86/03829, fitted onto the stylus holder in place of the stylus.

The probe may combine the touch trigger data from the piezoelectric crystal and analogue data from the analogue transducers as disclosed in more detail in EP0344289. It is also possible to turn off the trigger sensor and use the probe as a simple analogue probe. However, it may also be desirable to use the probe as a simple touch trigger probe.

The present invention allows the analogue part of the probe to be locked and thus enables the combined probe to be used solely as a touch trigger probe. This is achieved by driving the probe into the datum position and thereby locking the analogue transducers in the body of the probe, for example by one of the methods described above. With the analogue part of the probe locked, the probe may be used solely as a touch trigger probe. The probe may therefore be used in combined mode, analogue only mode and touch trigger only mode.

Use of the probe in touch trigger mode has the advantage that during high speed moves the probe will not suffer from dynamic errors due to acceleration. It is also advantageous to use such a combined probe in touch trigger only mode when probing an unknown surface. Using an analogue probe on such an unknown surface requires the machine on which the probe is mounted to be servoed which is time consuming, whereas using a touch trigger probe does not have this disadvantage and is much more straightforward.

This system of locking one set of transducers may be used with any type of dual probe. For example a combined analogue and non-contact surface sensing probe.

Figure 8:
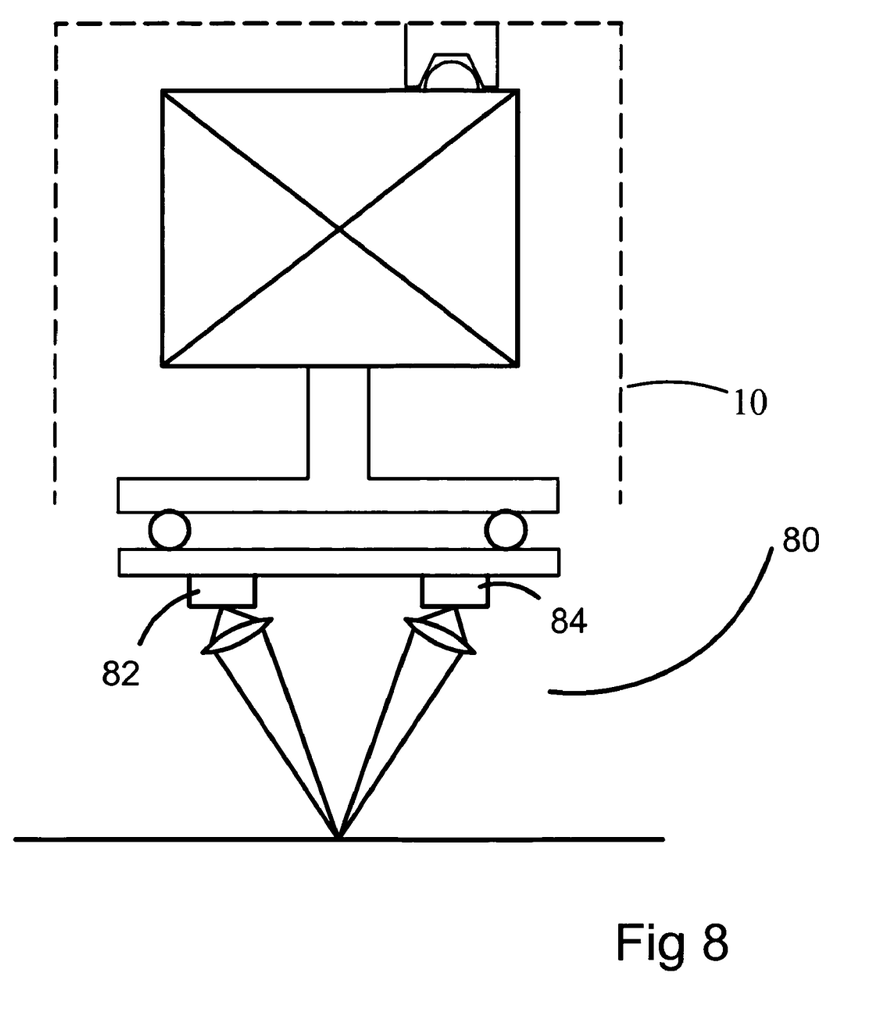
FIG. 8 illustrates a simplified internal view of a combined analogue and optical probe.

FIG. 8 illustrates a combined analogue and optical probe. In this example, the main body of the probe is as described in the previous embodiments and the stylus module has been replaced by an optical sensing module 80. The optical sensing module may be of any type, typically comprising a light source 82 to project light onto a surface and a detector 84 to detect the reflected light from the surface. Likewise, any other type of non-contact module may be mounted onto the probe body. For example, a module which uses capacitance or inductance sensing techniques to locate the part surface.

The combined probe may have two sets of analogue transducers. For example, the stylus module may comprise a probe as described in International Patent Application No. WO00/60310 which includes a hollow stylus wherein an optical transducer system is provided within the stylus assembly. A light source directs a light beam towards a retroreflector in the stylus tip which is reflected towards a detector, such that lateral displacement of the stylus tip can be measured.

The invention claimed is:

1. A probe for use in measuring apparatus comprising:
   a housing;
   a member movable with respect to the housing onto which a stylus may be mounted such that movement of the stylus results in movement of the member;
   a first transducer system for measuring movement of the member relative to the housing;
   a second transducer system which measures one of a property of the probe or a relationship between the probe and an adjacent surface;
   wherein the member may be located in a defined rest position with respect to the housing;
   and wherein when the member is located in this defined rest position, the first transducer system is locked but the second transducer system is not locked.

2. A probe according to claim 1 in which the member and the housing or a body connected to the housing are each provided with complementary location elements whereby the member or body may be biased or driven to a position where the member is held in a defined rest position with respect to the housing, said defined rest position being defined by the location elements.

3. A probe according to claim 2 wherein one of the member or the body may be biased or driven along a single axis to a position where the member is held in the defined rest position with respect to the housing about at least two axes.

4. A probe according to claim 1 wherein the second transducer system produces a touch trigger signal.

5. A probe according to claim 1 wherein the second transducer system measures the range of movement of the member relative to the housing.

6. A probe according to claim 1 wherein the second transducer system is a non-contact transducer system.

7. A probe according to claim 1 wherein when the member is located in its defined rest position, its movement is constrained in three dimensions.

8. A probe according to claim 1 wherein the defined rest position is a kinematically defined rest position.

9. An analogue probe for use in measuring apparatus comprising:
   a housing;
   a member movable with respect to the housing onto which a stylus may be mounted such that movement of the stylus results in movement of the member; wherein the member and the housing or a body connected to the housing are each provided with complementary location elements;
   whereby one of the member and body may be biased or driven along one axis to a position where the member is held in a defined rest position with respect to the housing about at least two axes, said rest position being defined by the location elements; and whereby during movement of the member or the body, the biasing or driving means allows movement of the member relative to the housing in a direction perpendicular to said axis.

10. An analogue probe according to claim 9 wherein biasing means are provided to bias the member into the defined rest position and wherein the member is biased into the defined rest position when there is no stylus mounted on the member.

11. An analogue probe according to claim 10 wherein when a stylus is mounted on the member, the weight of the stylus holds the member away from the defined rest position.

12. An analogue probe according to claim 9 wherein driving means are provided to drive the member or body to a position where the member is held in the precisely defined rest position.

13. An analogue probe according to claim 9 wherein the defined rest position acts as a datum position.

14. An analogue probe according to claim 9 wherein the analogue probe is provided with transducer system to measure the position of the member relative to the housing; wherein the transducer system outputs are input into a digitising circuit; and wherein when the member is located in the defined rest position, counters in the digitising circuit are set to zero.

15. An analogue probe according to claim 9 wherein the probe includes a first transducer system which measures the movement of the member relative to the housing and a second transducer system which measures a property of the probe or the relationship between the probe and a surface adjacent the probe, whereby when the member is in the defined rest position the first transducer system is locked and the second transducer system is not locked.

* * * * *